Oct. 9, 1956　　　M. L. MILLER　　　2,766,419
ELECTRIC CONTROL CIRCUIT
Filed April 3, 1953
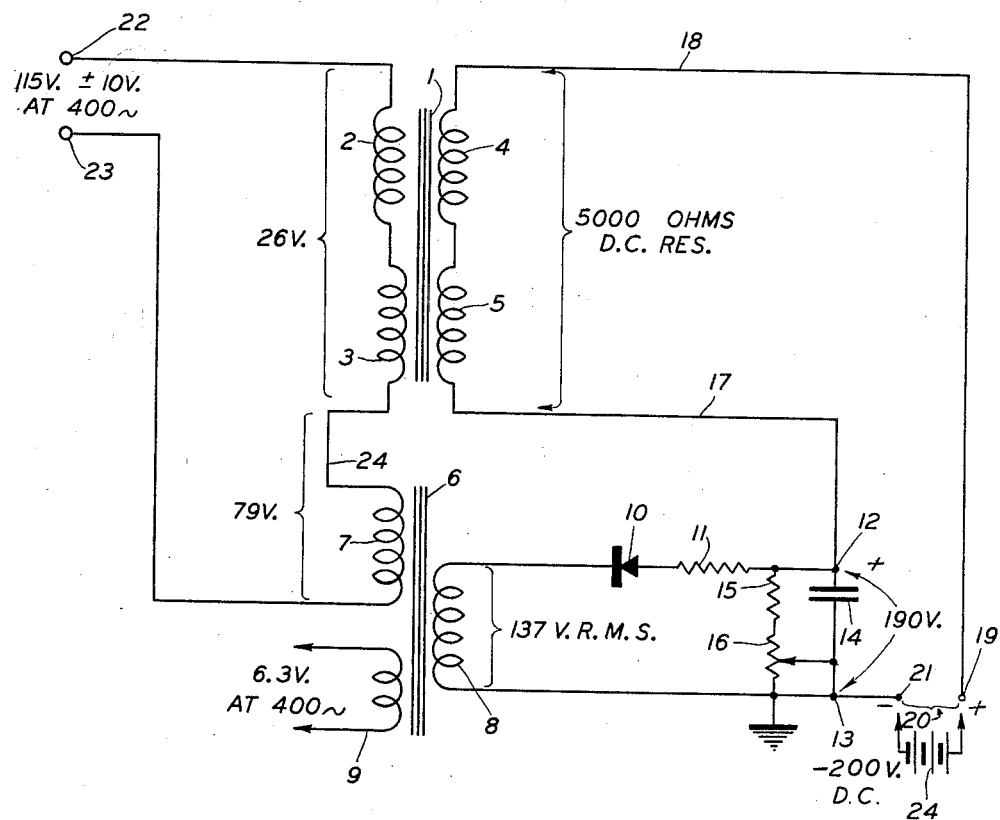
INVENTOR.
MERITT L. MILLER
BY
Lockwood, Galt, Woodard, & Smith
ATTORNEYS

United States Patent Office 2,766,419
Patented Oct. 9, 1956

2,766,419

ELECTRIC CONTROL CIRCUIT

Meritt L. Miller, Fort Wayne, Ind., assignor to International Telephone and Telegraph Corporation, a corporation of Maryland Application April 3, 1953, Serial No. 346,568

6 Claims. (Cl. 323—66)

The present invention relates to an electric control circuit, and more particularly to the regulation of an alternating output voltage from a circuit which utilizes an alternating current input voltage.

In the operation of electronic circuits, it is in some instances necessary to provide a stable source of heater voltage for the vacuum tubes. Various methods have been proposed for regulating or stabilizing such heater voltage, but such methods have been found wanting in certain respects including that of reqiuring regulating equipment of unsuitably large size.

It is an object of this invention to provide an electric control circuit for supplying a stable A. C. voltage.

It is another object of this invention to provide an electric control circuit for supplying a regulated A. C. voltage by the use of variable impedance means which operates in response to a D. C. control voltage inherently generated by the circuit.

It is still another object of this invention to provide an electric control circuit for producing a stable A. C. voltage by means of a magnetic core reactor which is energized by a D. C. potential obtained by the combination of a reference voltage obtained from an external source and a voltage inherently produced by the circuit, the reactor providing a variable impedance which maintains said output voltage constant even though the A. C. voltage supplied to the circuit varies.

In accordance with the present invention there is provided an alternating current control circuit comprising impedance-varying means responsive to a D. C. control current, a transformer having primary and secondary windings with the primary winding conductively connected to said means in such a manner as to provide an input circuit across which an alternating supply voltage may be applied, this supply voltage dividing across said means and said primary winding in accordance with the respective impedances thereof, a rectifier circuit conductively coupled to said secondary winding and serving to produce a unidirectional control voltage having a value proportional to the voltage impressed on the primary winding of said transformer, means conductively connecting the control voltage to said impedance-varying means for controlling the impedance of the latter, and a source of reference potential also conductively connected to said impedance-varying means for supplying a D. C. potential to the latter, this D. C. potential being combined with said control voltage for obtaining a resultant impedance-varying voltage for said means which varies in accordance with voltage changes occurring across said primary winding.

For a better understanding of the invention, together with other and further objects thereof, reference is made to the following description, taken in connection with the accompanying drawing, and to the claims wherein the scope of the invention is defined.

In the accompanying drawing:

The figure is a circuit diagram of an embodiment of this invention.

Referring to the drawings, a saturable core reactor or impedance-varying means 1 is provided with two series connected, oppositely wound coils 2 and 3 which, in the preferred arrangement, are so arranged on the core as to produce cancelling fields for a purpose which will be explained more fully hereafter. A D. C. winding indicated by the two series connected coils 4 and 5 are also applied to the reactor core for controlling the permeability thereof in accordance with the usual practice.

A supply transformer 6 is provided with a primary winding 7, and two secondary windings 8 and 9, the winding 9 serving as the output circuit from which a stabilized A. C. voltage may be obtained. The secondary winding 8 is connected to a rectifying circuit which includes a dry rectifier or vacuum tube diode 10, a resistor 11 connected in series with the rectifier 10, and two voltage output points identified by reference numerals 12 and 13, respectively. A filter condenser 14 is bridged across these two points 12 and 13, and two series resistors 15 and 16 are connected across this condenser 14. The resistor 16 is adjustable as shown so as to vary the load on the rectifying circuit and the value of rectified voltage appearing across the points 12 and 13. The rectifying circuit is arranged to supply a positive voltage to the point 12. A line 17 connects point 12 to the lower end of the coil 5, and another line 18 connects the upper end of the coil 4 to a terminal 19 of a reference potential input circuit generally indicated by the reference numeral 20. The terminal 21 of this input circuit 20 is conductively connected to the terminal 13 preferably grounded as shown.

With the coils 2 and 3 of the reactor 1 wound as described in the foregoing, no A. C. voltage will be induced in the core magnetizing windings 4 and 5 which is an essential requirement in the proper operation of the associated circuit.

The supply voltage input circuit is comprised of the terminals 22 and 23 which are connected respectively to the upper end of the coil 2 and the lower end of primary winding 7. A wire 24 connects the lower end of the coil 3 to the upper end of the coil 7. For convenience in explaining the operation, the two coils 2 and 3 of the reactor will be referred to as the "reactor primary."

In a typical working embodiment, the circuit components are so selected and arranged as to provide a division of voltages across the reactor primary and the transformer primary 7 as indicated in the drawing when a voltage of 115 volts at 400 cycles is applied to the terminals 22 and 23. The winding 8 of the transformer 6 provides 137 volts R. M. S. and the rectifier components are so selected as to supply a voltage of 190 volts across the points 12 and 13. A value of 200 volts D. C. is applied to the reference voltage terminals 19 and 21 with the positive connection being made to the terminal 19 and the negative connection to the terminal 21. With this arrangement of polarities, the resultant core magnetizing voltage appearing across the coils 4 and 5 is the difference (10 volts) between the two voltages supplied at points 12 and 13, and terminals 19 and 21, respectively. The D. C. resistance of the series coils 4 and 5 is 5000 ohms.

Assuming the foregoing distribution of voltages, the 10 volts difference between the reference voltage 24 and the rectified voltage appearing across points 12 and 13 will serve to magnetize the core of the saturable reactor to a certain operating point on the latter's permeability curve. The coils 4 and 5 of the reactor are so designed as to magnetize the core to a suitable point on the curve as will be explained more fully hereafter.

With ten volts applied across the two coils 4 and 5, and exactly 115 volts applied to the terminals 22 and 23, a stable voltage will be supplied by transformer winding 9. However, if it is assumed that the voltage applied to the terminals 22 and 23 rises, for example, the new voltage will be apportioned across the reactor and transformer primaries. The increased voltage applied to the transformer primary 7 will serve to increase the voltage in the winding 8 and to effect a corresponding increase in the rectified voltage appearing across the points 12 and 13. With an increase in this rectified voltage, the resultant energizing voltage applied across the two coils 4 and 5 will be decreased thereby effecting an increase in the reactance of the reactor primary 2, 3. More voltage drop will now appear across the reactor primary 2, 3 which serves to return the voltage across the winding 7 of the transformer 6 to that of the initial value of 79 volts.

From the foregoing, it will be seen that for a given tolerance variation in the input voltage applied to the terminals 22 and 23, the energizing voltage for the winding 7 of the transformer 6 will be maintained substantially constant. Proper compensating reactance in the reactor primary is obtained by magnetizing the reactor core for operation at a suitable point on its permeability curve, this point being controlled by the value of the voltage applied across the windings 4 and 5. In other words, the ampere turns of the coils 4 and 5 should be such as to effect an impedance change in the reactor primary which almost exactly offsets any voltage change across the primary winding 7.

In the illustrated circuit, the winding 9 supplies a stable heater potential of 6.3 volts; however, it will be readily understood by a person skilled in the art that any voltage winding may be used in place of the one described.

The compensating impedance variation of the reactor 1 is attributable to the behavior of iron core reactors wherein the core magnetization is influenced by both alternating and direct current components. The inductive reactance of the coil 2, 3 depends upon the point on the magnetization curve of the iron core about which the alternating current component varies. This point, as explained previously, is determined by the constant magnetization of the core by the direct current component (in winding 4, 5). The higher this point is located on the curve, the lower is the inductive reactance of the coil 2, 3, and consequently, the lower is the impedance of this coil, the ohmic non-inductive resistance being constant. To achieve a higher operating point on the curve, it is only necessary to increase the direct current, magnetizing component through windings 4, 5. The present invention utilizes this principle of operation in accomplishing the desired end.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

It will be understood that the circuit specifications of the foregoing description have been given by way of example only and may vary according to design desiderata.

What is claimed is:

1. An electrical control circuit for regulating an alternating output voltage comprising a source of alternating voltage, variable impedance means responsive to a D. C. control current having an amplitude dependent upon said source of voltage, fixed impedance means coupled to said source including an output impedance and a voltage-deriving circuit coupled to said variable means for deriving unidirectional output voltage of constant amplitude proportional to the voltage of said source, a source of reference potential, and circuit means coupled between said voltage-deriving circuit, said source of reference potential and said variable impedance means for combining said unidirectional voltage and said reference potential to impress on said variable impedance means a difference voltage representative of variations of voltage of the first-mentioned source, thereby to vary the impedance of said variable impedance means and to maintain a constant output voltage across said output impedance.

2. An electric control circuit comprising impedance-varying means having an impedance value responsive to an unidirectional control current, a fixed impedance means having primary and secondary impedances, a rectifier circuit coupled to said impedance means and serving to produce an unidirectional control current proportional to the voltage impressed on the primary impedance, said primary impedance being coupled to said impedance-varying means whereby a source of input voltage applied thereto will divide between said impedance-varying means and said primary impedance according to the respective impedances thereof, means conductively connecting the unidirectional current of said rectifier circuit to said impedance-varying means for determining the impedance of the latter, and reference potential circuit means also conductively connected to said impedance-varying means for supplying a reference D. C. potential which is operative in cooperation with said unidirectional current to control the impedance of said impedance-varying means as a voltage change occurs across said primary impedance.

3. An electric control circuit comprising impedance-varying means having a value of impedance responsive to a D. C. control current, a transformer having primary and secondary windings, a rectifier circuit coupled to said secondary winding and serving to produce a D. C. voltage proportional to the voltage impressed on the primary winding, said primary winding being connected in series with said means whereby a source of input voltage applied there across will divide between said means and said primary winding according to the respective impedances thereof, means conductively connecting the D. C. voltage of said rectifier circuit to said impedance-varying means, and reference potential circuit means also conductively connected to said impedance-varying means for supplying a reference D. C. potential which is operative in cooperation with said D. C. voltage to vary the impedance of said impedance-varying means as a voltage change occurs across said primary winding.

4. An electric control circuit comprising an inductive reactor having two windings thereon and having an inductance which varies in response to a D. C. control voltage applied to one of the windings, a transformer having primary and secondary windings, said primary winding being connected in series with the other winding of said reactor whereby an A. C. voltage applied across these series connected windings will divide in accordance with the respective impedance thereof, a rectifier circuit coupled to said secondary winding and serving to produce a D. C. voltage proportional to the voltage impressed on the primary winding, means conductively connecting the D. C. voltage of said rectifier circuit to said one reactor winding, and reference potential circuit means also conductively connected to said one reactor winding for supplying a reference D. C. potential which is operative in conjunction with said D. C. voltage to vary the impedance of said other reactor winding as a voltage change occurs across said primary winding.

5. An electric control circuit comprising a saturable core reactor having two windings thereon and having an inductance which varies in response to a D. C. control voltage applied to one of the windings, a transformer having primary and secondary windings, said primary winding being connected in series with the other winding of said reactor whereby an A. C. voltage applied across these series coupled windings will divide in accordance with the respective impedances thereof, a rectifier circuit coupled to said secondary winding and serving to produce a D. C. voltage proportional to the voltage impressed on the primary winding, means conductively connecting the D. C. voltage of said rectifier circuit to said one reactor winding, and reference potential circuit means also conductively connected to said one reactor winding for supplying a reference D. C. potential which is operative in conjunction with said D. C. voltage to vary the impedance of said other reactor winding as a voltage change occurs across said primary winding.

6. An electric control circuit comprising a saturable core reactor having two windings thereon and having an inductance which varies in response to a D. C. control voltage applied to one winding, a transformer having primary and secondary windings, said primary winding being connected in series with the other winding of said reactor whereby an A. C. voltage applied across the series coupled windings will divide in accordance with the respective impedance thereof, a rectifier circuit including a rectifier connected in series with said secondary winding and two terminal points which provide a D. C. voltage having a value proportional to the value of voltage impressed on said primary winding, a variable load resistor conductively connected between said terminals for adjusting said D. C. voltage, a conductive connection between one of said terminals and one end of said one reactor winding, and a reference potential circuit provided with first and second terminal points the first terminal being connected to the other of said two terminals and the second terminal being connected to the other end of said one reactor winding whereby a reference D. C. potential applied to said first and second terminal points will operate in conjunction with said D. C. voltage to vary the impedance of said other reactor winding as a voltage change occurs across said primary winding.

References Cited in the file of this patent
UNITED STATES PATENTS

| | | |
|---|---|---|
| 2,569,605 | Hall | Oct. 2, 1951 |
| 2,615,066 | Milne | Oct. 21, 1952 |